United States Patent Office 2,694,078
Patented Nov. 9, 1954

2,694,078
ISOMERIZATION

Arnold C. Ott and George Slomp, Jr., Kalamazoo, Mich., assignors to The Upjohn Company, Kalamazoo, Mich., a corporation of Michigan No Drawing. Application February 19, 1952,
Serial No. 272,496

12 Claims. (Cl. 260—397.45)

This invention relates to a novel process for the isomerization of certain enol-acylates and is more particularly concerned with a novel process for the isomerization of certain $\Delta^{20}$-steroid-20-acylates to produce $\Delta^{17(20)}$-steroid-20-acylates.

The starting compounds of the present invention are the $\Delta^{20}$-steroid-20-acylates which have a pregnane carbon skeleton, which skeleton may be represented by the following structural formula:

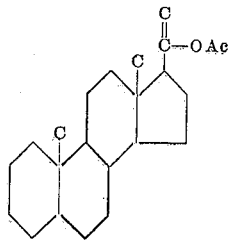

wherein the sole substitution, other than carbon, at carbon atoms 17 and 21 is hydrogen and wherein Ac is the residue of an organic acid.

Compounds of the above-described structure include pregnenes, pregnadienes, pregnatrienes, pregnatetrenes, and others, which, at various positions of the nucleus, may contain halogen atoms, adduct radicals and epoxide linkages, as well as esterified, etherified or unsubstituted hydroxy groups, keto-groups, and other substituents. It is to be understood that under the conditions of reaction the nature of some of these substituents may change. For example, a hydroxy-group in the 3-position would be esterified. However, this is merely an accompanying reaction and in no way affects the scope of the present invention.

It is an object of the present invention to provide a novel process for the conversion of certain $\Delta^{20}$-steroid-20-acylates to $\Delta^{17(20)}$-steroid-20-acylates. Other objects of the present invention will be apparent to those skilled in the art to which this invention pertains.

According to the method of the present invention, a $\Delta^{20}$-steroid-20-acylate which has the above carbon skeleton is mixed with an anhydrous ionic acidic solvent in the presence of an acid catalyst, and heated at a temperature between about room temperature and about one hundred and fifty degrees centigrade, to produce a $\Delta^{17(20)}$-steroid-20-acylate.

The novel process of the present invention is useful in the preparation of $\Delta^{17(20)}$-steroid-20-acylates from $\Delta^{20}$-steroid-20-acylates and is especially useful in the preparation of certain $\Delta^{17(20)}$-pregnene-20-acetates from $\Delta^{20}$-pregnene-20-acetates, which are known to be valuable intermediates in the preparation of Cortisone, Compound F, and the like. Moreover the $\Delta^{17(20)}$-steroid-20-acylates are produced free from starting material and in high yield, making said $\Delta^{17(20)}$-steroid-20-acylate products of the present invention especially suitable as precursors of steroids with a dihydroxy acetone side chain such as is found in Cortisone and Kendall's Compound "F," for example, which compounds are known to possess valuable biological activity.

The $\Delta^{20}$-steroid-20-acylates which are utilized as starting materials may be prepared from the corresponding 20-keto steroids by the reaction of said 20-keto steroids with the selected isopropenyl acylate and an acidic catalyst according to procedure described more completely in the preparations following in this specification. The preferred starting materials are the $\Delta^{20}$-steroid-20-acetates, which are prepared by using isopropenyl acetate as the enol-acylating agent.

Among the $\Delta^{20}$-steroid-20-acetates, preparable according to the procedure given above, which may be used as starting materials in the method of the present invention, are: 3α,20 - diacetoxy - 20 - pregnene - 11 - one, 3β,20 - diacetoxy - 20 - pregnene - 11 - one, 3β,20 - diacetoxy - 20 - allopregnene - 11 - one, 3β,20 - diacetoxy - 20 - allopregnene, 3β,20 - diacetoxy - 5,20 - pregnadiene, 3,20 - diacetoxy - 3,5,20 - pregnatriene, 3,11α,20 - triacetoxy - 3,5,20 - pregnatriene, 3β,20 - diacetoxy - 5,7,9(11),20 - pregnatetraene, 3β,20 - diacetoxy - 5,7,9(11),20 - pregnatetraene dimethyl maleate adduct, 3β,20 - diacetoxy - 5,7,9(11),20 - pregnatetraene maleic anhydride adduct, 3β,20 - diacetoxy - 9(11) - oxido - 5,7,20 - pregnatriene maleic anhydride adduct, 3β,20 - diacetoxy - 9(11) - oxido - 5,7,20 - pregnatriene dimethyl maleate adduct, and others.

Similarly, other $\Delta^{20}$-steroid-20-acylates are prepared by the reaction of the selected 20-keto-steroid with the appropriate isopropenyl acylate in the presence of a suitable acid catalyst such as, for example, para-toluenesulfonic acid, or by ester exchange of the selected $\Delta^{20}$-steroid-20-acetate with the appropriate organic acid or acid anhydride by a procedure well known in the art. Such compounds include 3β,20 - dipropionyloxy - 20 - allopregnene, 3β,20-dibutyryloxy - 5,20 - pregnadiene, 3,20 - divaleryloxy - 3,5,20 - pregnatriene, 3,11β,20 - dihexanoyloxy - 3,5,20 - pregnatriene, 3β,20 - diheptanoyloxy - 11 - keto - 20 - pregnene, 3β,20 - dioctanoyloxy - 11 - keto - 20 - pregnene, 3β - acetoxy - 20 - octanoyloxy - 11 - keto - 20 - allopregnene, 3,20 - diacyloxy homologues of these and other compounds wherein the 3,20-diacyloxy groups are residues of monocarboxylic lower-aliphatic acids containing from one to eight carbon atoms, inclusive, and others. The preparation of these and other requisite starting compounds is described more fully in the preparations following in this specification.

In carrying out the method of the present invention, the selected $\Delta^{20}$-steroid-20-acylate, having the above-described carbon skeleton, wherein the acylate radical is the residue of a lower-aliphatic monocarboxylic acid containing from one to eight carbon atoms, inclusive, preferably a $\Delta^{20}$-steroid-20-acetate, is mixed with an anhydrous ionic acidic solvent in the presence of an acid catalyst. Solvents such as formic acid, glacial acetic acid and acid anhydrides are operative although the acid anhydrides of the formula Ac₂O, Ac being the residue of a lower-aliphatic monocarboxylic acid containing from one to eight carbon atoms, inclusive, and especially acetic anhydride, are preferred. The acid catalysts include such compounds as para-toluenesulfonic acid, sulfosalicylic acid, sulfoacetic acid, benzenesulfonic acid, sulfuric acid, hydrochloric acid, Dowex-50 (a sulfonated polystyrene resin), and others, with para-toluenesulfonic acid being preferred.

The resulting mixture is heated at a temperature between about room temperature and the boiling point of the reaction mixture for a period between about less than an hour to about 96 hours. The exact temperature depends, in part, on the reactants used and the boiling point of the solvent. When acetic anhydride is used, the temperature is usually maintained at the boiling point of the acetic anhydride. The preferred operating conditions involve heating the reaction mixture at a temperature between about fifty degrees and the boiling point of said mixture for about one-half hour to about eight hours.

Isolation of the reaction product is accomplished by mixing the cooled mixture with ice and water and extracting the product with an organic solvent such as ether or methylene chloride, for example. The organic solvent extract is then usually washed, dried, and evaporated. The $\Delta^{17(20)}$-steroid-20-acylate residue may be purified in conventional manner, such as by crystallization from a suitable organic solvent, for example.

The following examples are illustrative of the process and products of the present invention but are not to be construed as limiting.

Preparation 1.—Maleic Anhydride Adduct of 3β-Acetoxy-Bisnor-5,7,9(11)-cholatriene-22-al A two-liter, round-bottom flask was charged with fifty grams (0.93 mole) of dehydroergosteryl acetate maleic anhydride adduct and one liter of methylene chloride. Dehydroergosteryl acetate maleic anhydride adduct may be prepared by the addition of maleic anhydride to dehydroergosterol acetate according to known methods [Honigmann, Ann., 508, 89 (1934)] which in turn can be prepared by the reaction of ergosteryl acetate with mercuric acetate according to known methods [Windaus et al., Ann., 465, 157 (1928)]. The solution was cooled to Dry-Ice temperature with a trichloroethylene bath and ozonized oxygen passed through at a rate of 1200 milliliters of oxygen per minute (at this rate the ozonizer was producing about 36 milligrams of ozone per minute). The flow of ozonized oxygen was maintained for 128 minutes, a total of 4608 milligrams (105 per cent) of ozone being passed into the solution. The reaction mixture was transferred to a two-liter, round-bottom flask fitted with a capillary tube and a condenser for downward distillation, 300 milliliters of acetic acid added, and the methylene chloride distilled in vacuo at forty degrees centigrade or below. The flask was then placed in a water bath and fitted with a stirrer. An additional 200 milliliters of acetic acid was added and the ozonide decomposed by the addition of fifty grams of zinc dust. The zinc dust was added portionwise over a period of twenty to thirty minutes while the solution was stirred and the temperature was maintained at seventeen to twenty degrees centigrade. After addition was complete, the mixture was stirred for an additional twenty minutes and then filtered. The zinc dust was washed by filtering 100 milliliters of acetic acid therethrough, and the filtrate gradually diluted with water (1100 to 1200 milliliters) until the product had completely precipitated. The reaction mixture was cooled in a refrigerator overnight and then filtered. The yield of crystalline product was 42 grams, assaying 89–95 per cent of the desired aldehyde.

Preparation 2.—Maleic Anhydride Adduct of 3β,22-Diacetoxybisnor-5,7,9(11),20,(22)-cholatetraene A mixture of twenty grams of the maleic anhydride adduct of 3β-acetoxybisnor-5,7,9(11)-cholatriene-22-al (Preparation 1), six grams of anhydrous sodium acetate, and 600 milliliters of acetic anhydride, was heated under reflux for six hours, whereafter the volatile components were removed under reduced pressure. The resulting solid residue was digested with five fifty-milliliter portions of boiling acetone for five minutes each, whereafter the acetone extracts were combined and diluted with 130 milliters of water. There was thus-precipitated sixteen grams of the maleic anhydride adduct of 3β,22-diacetoxybisnor-5,7,9(11),20(22)-cholatetraene which after drying melted at 186 to 193 degrees centigrade. Recrystallization of the product from a mixture of acetone and pentane raised the melting point to 200.5 to 202 degrees centigrade.

Preparation 3.—Maleic Anhydride Adduct of 3β-Acetoxy-5,7,9(11)-pregnatriene-20-one A solution of 5.08 grams of the maleic anhydride adduct of 3β,22 - diacetoxybisnor - 5,7,9(11),20(22)-cholatetraene (Preparation 2) in 100 milliliters of methylene chloride was cooled to about minus seventy degrees centigrade and ozonized until 483 milligrams of ozone had been absorbed. Fifty milliliters of glacial acetic acid was then added thereto and the methylene chloride thereafter removed under reduced pressure. An additional thirty milliliters of glacial acetic acid was then added thereto and the ozonide decomposed by adding seven grams of powdered zinc at a substantially uniform rate while maintaining the reaction temperature between seventeen and twenty degrees centigrade. The resulting mixture was stirred for an additional twenty minutes, filtered, and the filter cake washed with 140 milliliters of glacial acetic acid. The organic extracts were combined and diluted with seventy milliliters of water. When crystallization of the product commenced, the rate of precipitation was increased by the addition of two volumes of water. There was thus-obtained 4.0 grams of the maleic anhydride adduct of 3β-acetoxy-5,7,9(11)-pregnatriene-20-one which melted at 240 to 264.5 degrees centigrade. Several recrystallizations of the crude material from acetone raised the melting point to 263.5 to 264.5 degrees centigrade.

Preparation 4.—Dimethyl Maleate Adduct of 3β-Acetoxy-5,7,9(11)-pregnatriene-20-one A suspension of fifteen grams of 3β-acetoxy-5,7,9(11)-pregnatriene-20-one maleic anhydride adduct (Preparation 3) in 320 milliliters of methanol was cooled in an ice-salt bath. A boiling chip was added and the suspension treated with approximately 775 milliliters of a methylene chloride solution of diazomethane added in 100-milliliter portions over a period of three hours, causing all of the solid to go into solution. At the end of this time, the solution was reduced to one-half its original volume on a steam bath to remove excess diazomethane, filtered and concentrated to about 250 milliliters. Upon cooling, crystals of the dimethyl maleate adduct of 3β-acetoxy- 5,7,9(11)-pregnatriene-20-one, melting at 204–208 degrees centigrade, were deposited. The yield was 13.2 grams (87 per cent of the theoretical).

Preparation 5.—Dimethyl Maleate Adduct of 3β-Acetoxy-9(11)-oxido-5,7-pregnadiene-20-one One gram (0.002 mole) of the dimethyl maleate adduct of 3β-acetoxy-5,7,9(11)-pregnatriene-20-one (Preparation 4) was dissolved in 25 milliliters of glacial acetic acid, and a solution of one milliliter of thirty per cent hydrogen peroxide (four molar equivalents) in six milliliters of glacial acetic acid was added thereto at room temperature. The reaction mixture was heated on the steam bath for four hours and thereafter allowed to stand at room temperature overnight. The mixture was then poured into 300 milliliters of water and the resulting precipitate was separated by filtration, washed with water, and dried. The yield of the oxido compound, melting at 197–206 degrees centigrade, was 810 milligrams. After five recrystallizations from methanol and acetone-hexane, the dimethyl maleate adduct of 3β-acetoxy-9,11-oxido-5,7-pregnadiene-20-one thus-produced melted at 216–221 degrees centigrade, $[\alpha]_D^{26}$ plus 11.4 degrees (in chloroform).

Analysis:
　Per cent calculated for $C_{29}H_{38}O_8$:
　　C, 67.68; H, 7.44
　Found: C. 67.74; H, 7.35
　　　　C, 68.02; H, 7.49

Preparation 6.—3β-Acetoxy-5,7,9(11)-pregnatriene-20-one

Two grams (2.0 grams) of the maleic anhydride adduct of 3β-acetoxy-5,7,9(11)-pregnatriene-20-one (Preparation 3), melting point 258–262 degrees centigrade, was dissolved in eighteen milliliters of dimethyl aniline and heated under reflux in an atmosphere of nitrogen for four and one-half hours. The dimethyl aniline was distilled in vacuo and the residue chromatographed over alumina to give 1.5 grams (a yield of 94 per cent of the theoretical) of maleic anhydride-free material. Crystallization from methanol gave one gram (a yield of 66 per cent of the theoretical) of 3β-acetoxy-5,7,9(11)-pregnatriene-20-one, melting at 130–134 degrees centigrade. Recrystallization of a sample for analysis gave pure material, melting at 141-143 degrees centigrade. Ultraviolet absorption spectrum (in 95 per cent alcohol): maxima at 312.5 mu (E=9500), 325 mu (E=10,800), 339 mu (E=6700).

Preparation 7.—Maleic Anhydride Adduct of 3β-Acetoxy-9(11)-oxido-5,7-pregnadiene-20-one Five grams (0.011 mole) of the maleic anhydride adduct of 3β - acetoxy - 5,7,9(11) - pregnatriene - 20 one (Preparation 3) was dissolved in 120 milliliters of hot glacial acetic acid, the solution thereafter cooled to room temperature and a solution of five milliliters of thirty per cent hydrogen peroxide (four molar equivalents) in thirty milliliters of glacial acetic acid was added dropwise thereto with swirling. The reaction mixture was heated on the steam bath for three and one-half hours. The colorless solution was allowed to stand at room temperature overnight and thereafter poured into about one liter of water. The resulting precipitate was separated by filtration, washed with water, and dried in a vacuum desiccator. The dry product weighed 4.88 grams (a yield of 94.8 per cent of the theoretical) and melted at 232–246 degrees centigrade. After two recrystallizations from acetone, crystals of the maleic anhydride adduct of 3β-acetoxy-9(11)-oxido-5,7-pregnadiene-20-one, melting at 240–246 degrees centigrade, were obtained.

Analysis:
Percent calculated for $C_{27}H_{32}O_7$:
C, 69.21; H, 6.89
Found: C, 69.43; H, 6.94
C, 69.30; H, 6.97

PREPARATION 8.—11α-HYDROXYPROGESTERONE

To four liters of a 32–48 hour growth of culture RH 176 (*Rhizopus arrhizus* strain) was added one gram of progesterone in fifty milliliters of acetone, providing a suspension of the steroid in the water of the culture. The culture was then incubated at room temperature for 48 hours. At the end of this time the pH of the medium was 3.5 and the fermentation liquor and mycelia were extracted successively with three one-liter portions, one two-liter portion, and one one-liter portion of methylene chloride. The methylene chloride extracts were combined and washed with two 400 milliliter portions of two per cent aqueous sodium bicarbonate solution and three 500-milliliter portions of water. The methylene chloride extract was evaporated to dryness in vacuo and the solids taken up in fifty milliliters of methylene chloride. The solution was transferred to a 100-milliliter beaker and evaporated by a stream of air. The solids, weighing 1.585 grams, were dissolved in five milliliters of hot methanol which was thereafter allowed to cool slowly at room temperature whereupon 75 milligrams of crystals separated out. The mother liquor was freed of solvent by aeration, the residue dissolved in fifty milliliters of benzene and chromatographed over alumina ($Al_2O_3$). Fifty grams of acid-washed alumina, dried at 45 degrees centigrade, was used as absorbent and 100-milliliter portions of solvents were used to develop the column. The solvents and the order used were as follows: benzene, benzene, benzene plus 5 per cent ether, benzene plus 5 per cent ether, benzene plus 10 per cent ether, benzene plus 10 percent ether, benzene plus 10 per cent ether, benzene plus 50 per cent ether, benzene plus 50 per cent ether, ether, ether, ether plus 5 per cent chloroform, ether plus 5 per cent chloroform, ether plus 10 per cent chloroform, ether plus 10 per cent chloroform, ether plus 50 per cent chloroform, ether plus 50 per cent chloroform, chloroform, chloroform plus 5 per cent acetone, chloroform plus 5 per cent acetone, chloroform plus 10 per cent acetone, chloroform plus 10 per cent acetone, chloroform plus 50 per cent acetone, chloroform plus 50 per cent acetone, acetone, acetone, acetone plus 5 per cent methanol, acetone plus 5 per cent methanol, acetone plus 10 per cent methanol, acetone plus 10 per cent methanol, acetone plus 50 per cent methanol, acetone plus 50 per cent methanol. The chloroform and chloroform plus 5 per cent acetone eluates were combined, evaporated to dryness, and the residue dissolved in two milliliters of hot methanol and filtered. After overnight refrigeration, 171 milligrams of crystalline 11α-hydroxyprogesterone, melting at 166 to 167 degrees centigrade was obtained. A recrystallized sample gave the following constants: Melting point, 166–167 degrees centigrade; $[\alpha]_D^{20}$ plus 175.9 degrees (chloroform).

Analysis:
Per cent calculated for $C_{21}H_{30}O_3$: C, 76.40; H, 9.10
Found: C, 76.60; H, 8.92

The structure of this product was further established by its conversion, with chromic acid in acetic acid, to the known 11-ketoprogesterone [Reichstein, Helv. Chim. Acta, 23, 684 (1940); ibid., 26, 721 (1943)].

PREPARATION 9.—3β,20-DIACETOXY-5,7,9(11),20-PREGNATETRAENE DIMETHYL MALEATE ADDUCT

Two grams of 3β-acetoxy-5,7,9(11)-pregnatriene-20-one dimethyl maleate adduct (Preparation 4), twenty milliliters of isopropenyl acetate and 0.1 gram of para-toluenesulfonic acid were placed in a reaction flask to which was attached a short fractionating column. The mixture was heated to boiling and a mixture of acetone and isopropenyl acetate, distilling between 56 and 90 degrees centigrade, was collected over a period of from about eight to about ten hours. The para-toluenesulfonic acid was neutralized by the addition of solid sodium bicarbonate and the excess isopropenyl acetate removed by distillation under reduced pressure. Cold water and methylene chloride were added with stirring to the residue. The methylene chloride layer was separated, washed with water, dried over anhydrous sodium sulfate and the solvent removed. The residue, on crystallization from methanol, gave 1.3 grams of 3β,20-diacetoxy-5,7,9(11),20-pregnatetraene dimethyl maleate adduct, melting at 184–188 degrees centigrade. After crystallization from a mixture of methylene chloride and methanol followed by crystallization from acetone, the tetraene adduct melted at 196.5–198 degrees centigrade and an $[\alpha]_D^{25.5}$ of plus 86.3 degrees (1.01 per cent in chloroform).

Ozonization of the tetraene adduct dissolved in methylene chloride gave 3β-acetoxy-5,7,9(11)-etio cholatrienic acid dimethyl maleate adduct melting at 255–259 degrees centigrade.

PREPARATION 10.—3β,20-DIACETOXY-5,7,9(11),20-PREGNATETRAENE MALEIC ANHYDRIDE ADDUCT

In a manner similar to that of Preparation 9, 3β-acetoxy-5,7,9(11)-pregnatriene-20-one-maleic anhydride adduct (Preparation 3), isopropenyl acetate and para-toluenesulfonic acid gave 3β,20-diacetoxy-5,7,9(11),20-pregnatetraene maleic anhydride adduct melting at 219–220.5 degrees centigrade after crystallization from a mixture of acetone and isopropyl ether.

PREPARATION 11.—3β,20-DIACETOXY-9(11)-OXIDO-5,7,20-PREGNATRIENE MALEIC ANHYDRIDE ADDUCT

In a manner similar to that of Preparation 9, 3β-acetoxy-9(11)-oxido-5,7-pregnadiene-20-one maleic anhydride adduct (Preparation 7), isopropenyl acetate and para-toluenesulfonic acid gave 3β,20-diacetoxy-9(11)-oxido-5,7,20-pregnatriene maleic anhydride adduct which melted at 245–249 degrees centigrade after crystallization from acetone and had an optical rotation $[\alpha]_D$ of plus 14.2 degrees (1.03 per cent in chloroform).

PREPARATION 12.—3β,20-DIACETOXY-9(11)-OXIDO-5,7,20-PREGNATRIENE DIMETHYL MALEATE ADDUCT

In a manner similar to that of Preparation 9, 3β-acetoxy-9(11)-oxido-5,7-pregnadiene-20-one dimethyl maleate adduct (Preparation 5), isopropenyl acetate and para-toluenesulfonic acid gave 3β,20-diacetoxy-9-(11)-oxido-5,7,20-pregnatriene dimethyl maleate adduct melting at 213–215 degrees centigrade.

PREPARATION 13.—3β,20-DIACETOXY-5,7,9(11),20-PREGNATETRENE

In a manner similar to that of Preparation 9, 3β-acetoxy-5,7,9(11)-pregnatriene-20-one (Preparation 6), isopropenyl acetate and para-toluenesulfonic acid gave 3β,20-diacetoxy-5,7,9(11),20-pregnatetrene which melted at 163–166 degrees centigrade after crystallization from a mixture of methylene chloride and methyl alcohol and had an optical rotation $[\alpha]_D^{26}$ of plus 262.3 degrees (1.04 per cent in chloroform).

PREPARATION 14.—3,20-DIACETOXY-3,5,20-PREGNATRIENE

In a manner similar to that of Preparation 9, progesterone (3,20-diketo-4-pregnene), isopropenyl acetate and para-toluene-sulfonic acid gave 3,20-diacetoxy-3,5,20-pregnatriene which, after crystallization from methanol, melted at 83–87 degrees centigrade and had an optical rotation $[\alpha]_D^{24}$ of minus 119 degrees (1.293 per cent in chloroform).

PREPARATION 15.—3β,20-DIACETOXY-5,20-PREGNADIENE

Two grams of 3β-acetoxy-20-keto-5-pregnene (pregnenolone), twenty milliliters of isopropenyl acetate and 0.1 gram of para-toluenesulfonic acid were heated under reflux with acetone removal and the reaction product was isolated as in Preparation 9. After crystallization from methanol and methyl-ethyl ketone, 3β,20-diacetoxy-5,20-pregnadiene was obtained which melted at 122.5–123.5 degrees centigrade, and had an $[\alpha]_D^{26.5}$ of minus 45.8 degrees (1.623 per cent in chloroform).

PREPARATION 16.—3β,20-DIACETOXY-20-ALLOPREGNENE

A mixture of 6.91 grams of allopregnanolone acetate, 0.1 gram of para-toluenesulfonic acid and thirty milliliters of isopropenyl acetate were heated under reflux in a reaction pot to which was attached a short fractionating column. A mixture of acetone and isopropenyl acetate, distilling between 56 and 85 degrees centigrade and amounting to about fifteen milliliters, was removed over a period of about ten hours. The resulting brown solution was cooled and thereafter diluted with thirty milliliters of methylene chloride, ice was then added thereto and the mixture thereafter washed to alkalinity with a cold five per cent sodium hydroxide solution and a cold ten per cent sodium bicarbonate solution. The methylene chloride layer was washed with water until about neutral and then dried over anhydrous sodium sulfate. The solvent was removed and the residue crystallized from methanol. There was thus obtained 2.7 grams of 3β,20-diacetoxy-20-allopregnene melting at 87–88 degrees centigrade. A further 3.0 grams was obtained by concentrating the methanolic mother liquors and cooling.

PREPARATION 17.—3,11α,20-TRIACETOXY-3,5,20-PREGNATRIENE

Following the procedure of Preparation 9,3,11α,20-triacetoxy-3,5,20-pregnatriene is prepared by the reaction of 11α-hydroxyprogesterone (Preparation 8), with isopropenyl acetate in the presence of para-toluenesulfonic acid.

PREPARATION 18.—3,20-DIACETOXY-11-KETO-3,5,20-PREGNATRIENE

Following the procedure of Preparation 9, 3,20-diacetoxy-11-keto-3,5,20-pregnatriene is prepared by the reaction of 11-keto-progesterone with isopropenyl acetate in the presence of para-toluenesulfonic acid.

In a similar manner, 3α,20-diacetoxy-11-keto-20-pregnene, 3β,20-diacetoxy-11-keto-20-pregnene, and 3β,20-diacetoxy-11-keto-20-allopregnene are prepared by the reaction of isopropenyl acetate in the presence of para-toluenesulfonic acid with 3α-hydroxypregnane-11,20-dione, 3β-hydroxypregnane-11,20-dione [Von Euw, Lardon and Reichstein, Helv. Chim. Acta, 27, 821 (1944)] or 3β-hydroxyallopregnane-11,20-dione [Stork, Romo, Rosenkranz, and Djerassi, J. Am. Chem. Soc., 73, 3546 (1951)], respectively.

*Example 1.—3β,20-diacetoxy-17(20)-allopregnene*

A mixture of 2.60 grams (6.46 millimoles) of 3β,20-diacetoxy-20-allopregnene (Preparation 16), melting at 89 to 90 degrees centigrade, and one gram of para-toluenesulfonic acid mono-hydrate in thirty milliliters of acetic anhydride was heated for three hours at the boiling point of the refluxing acetic anhydride, a small portion of which was concomitantly removed by distillation. The reaction mixture was then cooled and mixed with crushed ice. After five minutes the resulting mixture was extracted twice with 100-milliliter portions of ether. The combined ether extracts were washed with a cold ten per cent sodium hydroxide solution until alkaline and then with water until essentially neutral. The ether extracts were then dried over anhydrous sodium sulfate and evaporated in vacuo leaving a residue of 2.65 grams of 3β,20-diacetoxy-17(20)-allopregnene as a glassy amorphous solid. No starting 3β,20-diacetoxy-20-allopregnane remained, as proved by the loss of the 1666 cm.⁻¹ infrared absorption band typical of a terminal double bond. From this glassy solid was isolated, after several crystallizations from methanol, 1.61 grams, a yield of 62 per cent of theoretical, of 3β,20-diacetoxy-17(20)-allopregnene, melting at 168–172 degrees centigrade, which was identical to an authentic sample prepared by the method of Gallagher, J. Am. Chem. Soc. 70, 1837 (1948).

*Example 2.—3,20-diacetoxy-3,5,17(20)-pregnatriene*

Following the procedure of Example 1, 3,20-diacetoxy-3,5,17(20)-pregnatriene is prepared from 3,20-diacetoxy-3,5,20-pregnatriene (Preparation 14) in the presence of para-toluene-sulfonic acid and acetic anhydride.

*Example 3.—3,20-diacetoxy-11-keto-3,5,17(20)-pregnatriene*

Following the procedure of Example 1, 3,20-diacetoxy-11-keto-3,5,17(20)-pregnatriene is prepared from 3,20-diacetoxy-11-keto-3,5,20-pregnatriene (Preparation 18) in the presence of para-toluenesulfonic acid and acetic anhydride.

*Example 4.—3,11α,20-triacetoxy-3,5,17(20)-pregnatriene*

Following the procedure of Example 1, 3,11α,20-triacetoxy-3,5,17(20)-pregnatriene is prepared from 3,11α,20-triacetoxy-3,5,20-pregnatriene (Preparation 17) in the presence of paratoluenesulfonic acid and acetic anhydride.

*Example 5.—3α,20-diacetoxy-11-keto-17(20)-pregnene*

Following the procedure of Example 1, 3α,20-diacetoxy-11-keto-17(20)-pregnene is prepared from 3α,20-diacetoxy-11-keto-20-pregnene (Preparation 17) in the presence of para-toluenesulfonic acid and acetic anhydride.

*Example 6.—3β,20-diacetoxy-17(20)-allopregnene*

Following the procedure of Example 1, 3β,20-diacetoxy-17(20)-allopregnene is prepared by refluxing a mixture 3β,20-diacetoxy-20-allopregnene (Preparation 16) and sulfoacetic acid in glacial acetic acid.

*Example 7.—3β,20-dipropionyloxy-17(20)-allopregnene*

Following the procedure of Example 1, 3β,20-dipropionyloxy-17(20)-allopregnene is prepared from 3β,20-dipropionyloxy-20-allopregnene using para-toluenesulfonic acid as the reaction catalyst and propionic anhydride as a solvent.

In a similar manner as described in Examples 1 through 7, the following compounds are prepared from the corresponding selected $\Delta^{20}$-steroid-20-acylates using acetic anhydride and para-toluenesulfonic acid as reaction media or selected solvents and acid catalysts as described in preceding paragraphs of this specification: 3β,20-diacetoxy - 5,17(20) - pregnadiene, 3β,20 - diacetoxy - 5,7,-9(11),17(20) - pregnatetraene, 3β,20 - diacetoxy - 9(11)-oxido-5,7,17(20)-pregnatriene dimethyl maleate adduct, 3β,20-diacetoxy-5,7,9(11),17(20)-pregnatetraene maleic anhydride adduct and the corresponding dimethyl maleate adduct, 3β,20-diacetoxy-11-keto-17(20)-pregnene, 3β,20-diacetoxy-11-keto-17(20)-allopregnene, 3β,20-dipropionyloxy-11-keto-17(20)-pregnene, 3β,20-dibutyryloxy-11-keto - 17(20) - pregnene, 3β,20 - divaleryloxy - 11 - keto-17(20) - pregnene, 3β,20 - dihexanoyloxy - 11 - keto-17(20) - pregnene, 3β,20 - diheptanoyloxy - 11 - keto-17(20) - pregnene, 3β,20 - dioctanoyloxy - 11 - keto-17(20)-pregnene, and others.

It is to be understood that the invention is not to be limited to the exact details of operation or exact compounds shown and described, as obvious modifications and equivalents will be apparent to one skilled in the art, and the invention is therefore to be limited only by the scope of the appended claims.

We claim:

1. A process for the production of a $\Delta^{17(20)}$-steroid-20-acylate which includes the step of mixing a $\Delta^{20}$-steroid-20-acylate which has a pregnane carbon skeleton wherein the sole substitution other than carbon at carbon atoms 17 and 21 is hydrogen, with an acid catalyst in the presence of an anhydrous acidic ionic medium to produce a $\Delta^{17(20)}$-steroid-20-acylate.

2. A process for the production of a $\Delta^{17(20)}$-steroid-20-acylate which includes: mixing a $\Delta^{20}$-steroid-20-acylate which has a pregnane carbon skeleton wherein the sole substitution other than carbon at carbon atoms 17 and 21 is hydrogen and wherein the acylate radical has the formula AcO, with an acid catalyst in the presence of an acid anhydride of the formula Ac₂O, Ac in both instances being the residue of a lower-aliphatic monocarboxylic acid containing from one to eight carbon atoms, inclusive, and heating the mixture at a temperature between about room temperature and the boiling point of the reaction mixture to produce a $\Delta^{17(20)}$-steroid-20-acylate.

3. A process for the production of a $\Delta^{17(20)}$-steroid-20-acylate which includes: mixing a $\Delta^{20}$-steroid-20-acylate which has a pregnane carbon skeleton wherein the sole substitution other than carbon at carbon atoms 17 and 21 is hydrogen and wherein the acylate radical has the formula AcO, Ac being the residue of a lower-aliphatic monocarboxylic acid containing from one to eight carbon atoms, inclusive, with an acid catalyst in the presence of acetic anhydride and heating the mixture at a temperature between about room temperature and the boiling point of the reaction mixture to produce a $\Delta^{17(20)}$-steroid-20-acylate.

4. A process for the production of a $\Delta^{17(20)}$-steroid-20-acylate which includes: mixing a $\Delta^{20}$-steroid-20-acylate which has a pregnane carbon skeleton wherein the sole substitution other than carbon at carbon atoms 17 and 21 is hydrogen and wherein the acylate radical has the formula AcO, with para-toluenesulfonic acid in the presence of an acid anhydride of the formula $Ac_2O$, Ac in both instances being the residue of a lower-aliphatic monocarboxylic acid containing from one to eight carbon atoms, inclusive, and heating the mixture at a temperature between about room temperature and the boiling point of the reaction mixture to produce a $\Delta^{17(20)}$-steroid-20-acylate.

5. A process for the production of a $\Delta^{17(20)}$-steroid-20-acylate which includes: mixing a $\Delta^{20}$-steroid-20-acetate which has a pregnane carbon skeleton wherein the sole substitution other than carbon at carbon atoms 17 and 21 is hydrogen with an acid catalyst in acetic anhydride and heating the mixture at a temperature between about room temperature and the boiling point of the reaction mixture to produce a $\Delta^{17(20)}$-steroid-20-acetate.

6. A process for the production of a 17(20)-pregnene-20-acetate which includes: mixing a 20-pregnene-20-acetate with an acid catalyst in acetic anhydride and heating the mixture at a temperature between about room temperature and the boiling point of the reaction mixture to produce a 17(20)-pregnene-20-acetate.

7. A process for the production of a 17(20)-pregnatriene-20-acetate which includes: mixing a 20-pregnatriene-20-acetate with an acid catalyst in acetic anhydride and heating the mixture at a temperature between about room temperature and the boiling point of the reaction mixture to produce a 17(20)-pregnatriene-20-acetate.

8. A process for the production of 3β,20-diacetoxy-17(20)-allopregnene which includes: mixing 3β,20-diacetoxy-20-allopregnene with an acid catalyst in acetic anhydride and heating the mixture at a temperature between about room temperature and the boiling point of the reaction mixture to produce 3β,20-diacetoxy-17(20)-allopregnene.

9. A process for the production of 3,20-diacetoxy-3,5,17(20)-pregnatriene which includes: mixing 3,20-diacetoxy-3,5,20-pregnatriene with an acid catalyst in acetic anhydride and heating the mixture at a temperature between about room temperature and the boiling point of the reaction mixture to produce 3,20-diacetoxy-3,5,17(20)-pregnatriene.

10. A process for the production of 3,20-diacetoxy-11-keto-3,5,17(20)-pregnatriene which includes: mixing 3,20-diacetoxy-11-keto-3,5,20-pregnatriene with an acid catalyst in acetic anhydride and heating the mixture at a temperature between about room temperature and the boiling point of the reaction mixture to produce, 3,20-diacetoxy-11-keto-3,5,17(20)-pregnatriene.

11. A process for the production of 3,11α,20-triacetoxy-3,5,17(20)-pregnatriene which includes: mixing 3,11α, 20-triacetoxy-3,5,20-pregnatriene with an acid catalyst in acetic anhydride and heating the mixture at a temperature between about room temperature and the boiling point of the reaction mixture to produce 3,11α,20-triacetoxy-3,5,17(20)-pregnatriene.

12. A process for the production of 3α,20-diacetoxy-11-keto-17(20)-pregnene which includes: mixing 3α,20-diacetoxy-11-keto- 20-pregnene with an acid catalyst in acetic anhydride and heating the mixture at a temperature between about room temperature and the boiling point of the reaction mixture to produce 3α,20-diacetoxy-11-keto-17(20)-pregnene.

References Cited in the file of this patent

FOREIGN PATENTS

| Number | Country | Date |
|---|---|---|
| 860,323 | France | Sept. 24, 1940 |